United States Patent [19]
Sallenave et al.

[11] 3,996,717
[45] Dec. 14, 1976

[54] METHOD OF BUILDING A WALL SURFACE LINKED UP WITH AN INITIAL WALL AND HAVING PREDETERMINED RELATIVE SHAPE AND POSITION

[75] Inventors: Guy Sallenave, Pornichet; André Chémereau, St-Nazaire; Jean-Paul Pomies, St-Nazaire; Georges Thomas, St-Nazaire; André Massanés, St-Nazaire, all of France

[73] Assignee: Chantiers de l'Atlantique, Paris, France

[22] Filed: Dec. 5, 1974

[21] Appl. No.: 529,923

[30] Foreign Application Priority Data
Dec. 20, 1973 France .......................... 73.45816

[52] U.S. Cl. .................................. 52/744; 52/745; 52/749; 52/750; 33/85; 264/46.5; 264/35
[51] Int. Cl.² .................. E04G 21/00; E04G 23/00
[58] Field of Search ............... 33/85, 180 I; 264/35, 264/261, 46.5; 52/749, 750, 364–367, 122, 390, 391, 403, 745, 744; 220/9 LG; 29/407; 404/72, 73, 99

[56] References Cited
UNITED STATES PATENTS

| 691,791 | 1/1902 | Meeker | 52/390 |
|---|---|---|---|
| 2,917,801 | 12/1959 | Fitzgerald | 264/261 |
| 3,085,482 | 4/1963 | Yakubik | 52/403 |
| 3,199,422 | 8/1965 | Rees | 404/73 |
| 3,339,778 | 9/1967 | Herrenschmidt | 220/9 LG |
| 3,775,929 | 12/1973 | Roodvoets et al. | 52/747 |

FOREIGN PATENTS OR APPLICATIONS

| 1,291,461 | 3/1962 | France | 52/749 |
|---|---|---|---|
| 427,823 | 11/1947 | Italy | 33/85 |
| 41,263 | 7/1937 | Netherlands | 52/749 |

Primary Examiner—James L. Ridgill, Jr.
Attorney, Agent, or Firm—Kenyon & Kenyon Reilly Carr & Chapin

[57] ABSTRACT

A method of building, by means of juxtaposed modular elements a reference wall surface to be connected with and having a relative position and shape predetermined with respect to an initial wall surface, consisting in determining a nominal distance of each element from said initial wall surface; positioning said modular element thereagainst at said distance after interposition of a settable filling product therebetween for filling in the gaps left between said initial wall and said modular elements for locking same in position.

9 Claims, 11 Drawing Figures

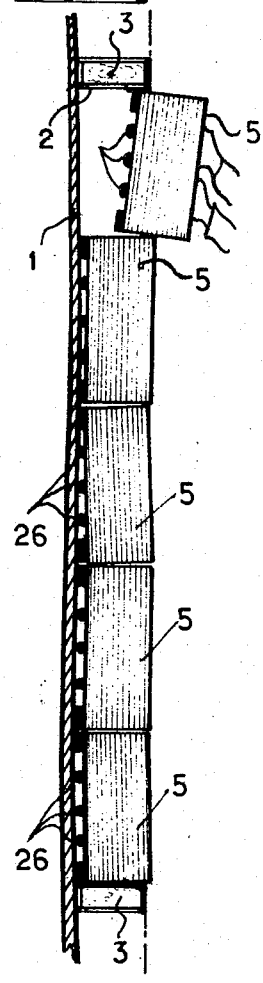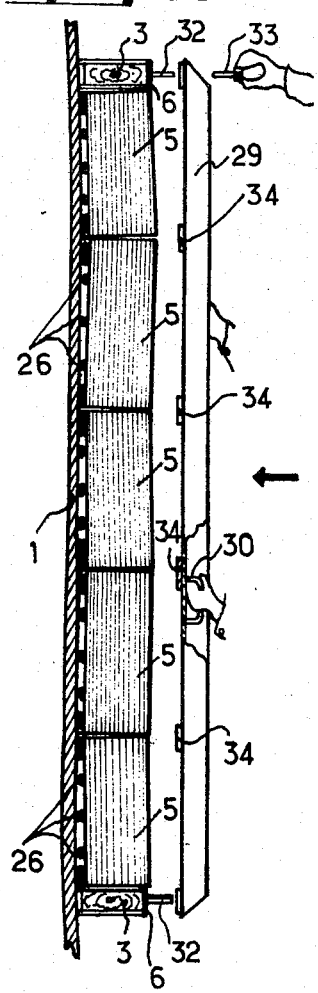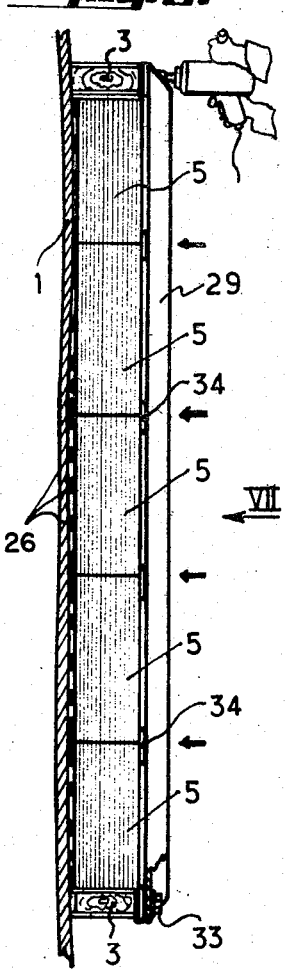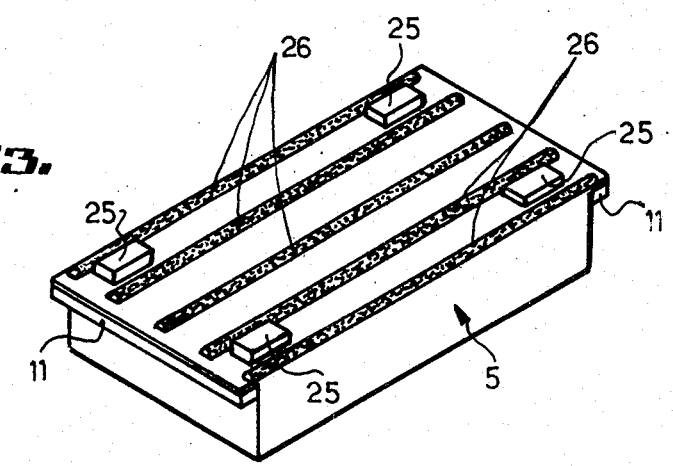

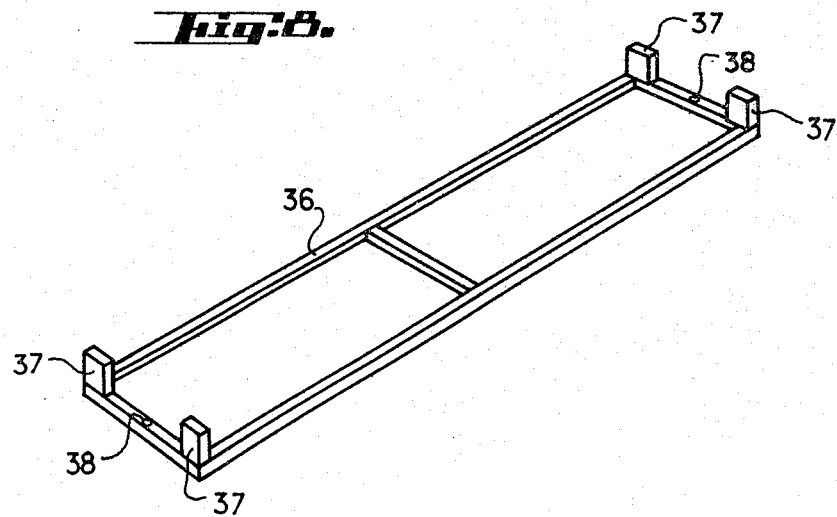
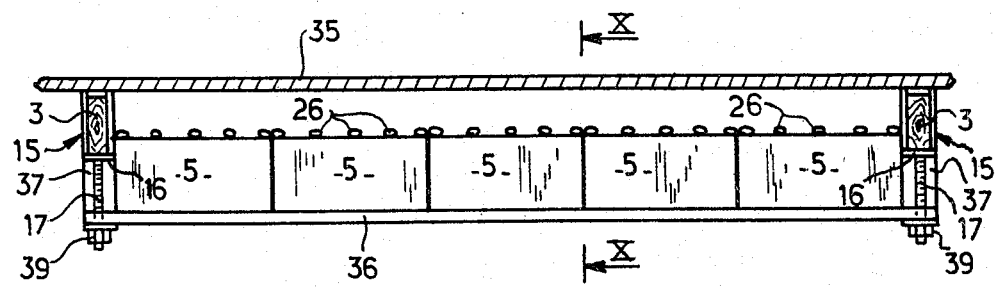
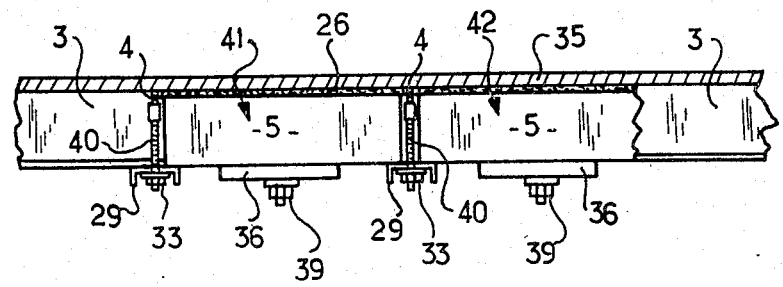

METHOD OF BUILDING A WALL SURFACE LINKED UP WITH AN INITIAL WALL AND HAVING PREDETERMINED RELATIVE SHAPE AND POSITION

The present invention relates generally to a method of building in particular by means of juxtaposed for instance prefabricated modular elements or like units of a real or physical reference wall surface with accurate geometrical definition or shape and relative position at least locally predetermined and preferably but not compulsorily of at least approximately and at least partially flat configuration, by starting from or with respect to any existing or initial wall surface whatsoever of indefinite, irregular or uneven configuration, i.e. for instance at least partially skew or warped and with a relative position locally indeterminate in space with which said real reference wall surface is necessarily (and possibly invariably or rigidly) connected or linked up.

The invention is also directed to the auxiliary or ancillary building devices forming mounting and/or adjusting implements or toolings for carrying out said process as well as to the various applications and uses resulting from practising this method and/or these auxiliary devices and to the systems, assemblies, apparatus, appliances or plants, machines, equipments, fittings and like facilities used for practising said process and/or provided with said devices.

The invention is in particular applicable to buildings or like erected structures, constructions or works required to exhibit for instance substantially or perfectly flat and exactly positioned inner walls fitted to the walls of the building.

The invention is thus for instance applicable to the construction of heat insulated and tightly sealed tanks or like isothermal enclosed spaces, containers or vessels in particular of large capacities for preserving and storing fluids, for instance cold liquids such as in particular liquified gases at low temperature, these tanks having for instance polyhedral and in particular prismatic or parallelepipedic shapes. Such large tanks may serve for instance to the conveyance or carriage of fluids and in particular form integrated tanks by being incorporated into the self-supporting structure of a vehicle body or of the hold within the ship's hull of a tanker, such tanks being also likely to form stationary land constructions.

It is known for instance that the walls of the self-supporting outer structure made in particular from sheet metal for marine transport tanks or for land-based storage tanks of large capacities generally exhibiting in view of their big sizes surface irregularities or unevenness such as hollows, pits or like depressions, bumps, bulges, cambers or bosses and like flatness defects or lacks of uniformity which may impede or prevent the achievement of an adequate proper bearing against said sheet metal wall of the modular elements or units forming the inner lining structure of the tank, i.e. a bearing complying with given requirements or meeting prescribed conditions. These inconveniences may also be present in the case of buildings made from masonry or stonework, concrete or other equivalent building materials when it is necessary to build up against such walls of buildings internal in particular heat insulated walls the visible or exposed surface of which is perfectly defined by its shape and its position in space.

To overcome such a difficulty, operating methods are known which are adapted in particular to mend or dress, correct or compensate for the flatness defects and other surface deficiencies but this method has the inconvenience to be based for a major part on a relatively inaccurate work of not very industrial character requiring much labour and time in particular on account of a great deal of manual labour for locally retouching or mending the wall and the modular elements as well as for checking or controlling in particular by means of thickness gauges, rulers and various measurement calipers, templets or jigs without obtaining a perfect result for all that. Moreover the quality of the bearings of some aforesaid modular elements of a given nature or operating function are difficult to control whereas the proper bearings of some other modular elements of a different character or operating function are also difficult to check.

One main or essential object of the invention is therefore to remove the aforesaid inconveniences of the prior state of the art by providing a method in particular for mounting or erecting the aforesaid modular elements which enables to attain the desired objects previously set forth. For this purpose the method according to the invention is characterized by the steps consisting: in determining beforehand a relative position or more exactly a nominal or desired distance or rated spacing of each aforesaid modular element as defined locally at its place with respect to said initial wall surface and positioning said modular elements on or against said initial wall in their respective accurate corresponding relative positions thus defined after having fitted or coated at least one certain portion of the bearing faces of at least some of said modular elements with a settable or hardenable filling product or like stuffing material consisting for instance of a bonding or binding stopping substance or plugging agent forming a kind of sealing compound or filling cement temporarily retaining its plastic condition, i.e. temporarily remaining in a soft, sticky or pasty state and/or subsequently injecting said product between at least one certain portion of the bearing faces of at least some of said modular elements and said initial wall, said product being delivered or coated up to an adequate thickness or amount thereby to at least locally fill up or seal all the free spaces, voids, joints, gaps and interstices left at least partially between said initial wall and said portions of bearing faces of said modular elements to thereby serve as an intermediate steadying, setting or adjusting and securing or fixing layer or like padding in particular through adhesive bonding for said modular elements.

One of the known processes previously used in the art consisted in carrying out a previous localization of the mounting places of said modular elements or units onto said initial wall according in particular to a basic for instance substantially regular network-like pattern of cross-rulings or squaring forming a checker-board lattice or grid-shaped layout with geometrical in particular rectangular meshes. Such a previous localization is retained in the method according to the invention and according to another characterizing feature thereof the method consists in providing an ideal visible for instance virtual comparison or localizing surface spaced from said initial wall while being preferably substantially flat and for instance at least approximately parallel generally to said wall; measuring the distance of said ideal comparison surface from said initial wall at each aforesaid place defined in particular by the crossing or point of intersection of two perpendicular straight lines belonging to said orthogonal criss-cross pattern thereby to provide a kind of topographical groundwork, sketch or like surveying skeleton map outline defining reference positions of at least some of said modular elements for thus constituting geometrical plotting records or charts of said initial wall; and processing as well as working these physical and technological measurements automatically and rationally according to a particular program through a data processing machine, electronic computer or like data processing system for defining at each location and according to the required flatness criteria and prescribed dimensional tolerances, the local distance value of an ideal reference surface adapted to contain the visible or exposed front faces of said modular elements or at least to form the tangential geometric envelope of said front faces, said distance value complying with the prescribed tolerance requirements; and then mounting said modular elements by respectively adjusting same to said distance values and afterwards securing or holding same against motion by means of said filling product interposed or applied in the aforesaid manner.

According to still another characterizing feature of the invention the method according to the latter consists in creating a luminous plane forming said visible ideal comparison surface detectable or sensible in particular by visualizing same by means of a coherent light beam produced by a rotary lamp or spotlight emitting or generating a laser beam (through light amplification by stimulated emission of radiation).

The new improved method according to the invention thus offers the advantage of using systematic and logical processes of position finding and locating in particular through discrete spots consisting in a way to provide said real reference surface by a kind of mathematical correspondance or transformation starting from said initial wall by means of a conformity or concordance relationship creating an accurate correlation between this real reference surface and said ideal comparison surface.

More specifically, the method according to the invention is for instance applicable to the building of one type of integrated tank known in particular from the first certificate of addition No. 84, 587 to the French Pat. No. 1,363,994 and from the French Pat. No. 1,438,330. Such a tank comprises two impervious respectively primary and secondary barriers made from relatively thin membrane-like sheet metal forming two envelopes, casings or shells arranged inside of each other and alternating with two respectively primary and secondary intermediate heat insulating layers interposed respectively on the one hand between both barriers and on the other hand between said secondary barrier and the self-supporting structure of the ship's hold by filling up the corresponding intermediate spaces, these layers of heat insulating material being adapted to support said impervious barriers and to convey the loads to the outer self-supporting structure. Said secondary heat insulating layer includes a wooden framework or like timber work consisting of spaced substantially parallel straight horizontal rows of beams or balks forming planks, joists, planks or like pieces of timber or wood boards carried by supporting brackets welded to the wall of the self-supporting structure and between which rows are held hollow parallelepipedic boxes made from wood and in particular plywood and divided inside into compartments by longitudinal and transverse partitions and filled with a powdery heat insulating material known in the trade under the name of "Perlite". The boxes are juxtaposed side by side so as to cover said self-supporting wall while bearing thereagainst and secured thereto by means of studs welded to the wall and receiving washers or bearing plates tightly clamped or pressed by screwed nuts against side ledges or cleats, strips or battens forming projecting flanges integral, respectively, with said boxes.

A known method of mounting said secondary heat insulating layer as used by some shipbuilding yards consisted in successively effecting the following operating steps: locating the beam supports and box fastening studs on the wall of the self-supporting structure; securing said beam supports and studs through welding; mending and correcting the flatness defects of the wall of the self-supporting structure to meet the bearing requirements of the secondary boxes on the wall and achieve a geometrical possibly ruled surface for the bearing of the secondary barrier; and mounting the framework and secondary boxes.

This known method exhibits the inconveniences already mentioned previously and involves the difficulty of controlling or checking the quality of the bearing as well as the proper positions of the boxes and secondary framework.

The method according to the invention is also in particular advantageously applicable to a construction of the aforesaid kind and more generally to a construction comprising an aforesaid initial wall of self-supporting structure and said modular elements, consisting on the one hand of a framework of spaced substantially parallel horizontal rows of adjacent in particular straight and preferably substantially aligned beams fastened respectively by means of supports or like holders to said initial wall and on the other hand of for instance substantially parallelepipedic panels, blocks or boxes juxtaposed and held between said rows and secured by studds to said initial wall, the method according to the invention being then of the kind consisting in previously determining or finding out the locations for laying said supports and studs according to a basic criss-cross pattern on said initial wall and being characterized in that it consists in determining said nominal theoretical distance values at every beam support location and then securing said supports to said initial wall possibly after previous affixing of said studs thereto, said affixing being carried out for instance through electric arc welding.

The method according to the invention is thus applicable to a construction comprising said beams bearing each one with its opposite ends, respectively, against two successive aforesaid supports of a same aforesaid row, each support consisting of a straight bracket secured with one end at right angles to said initial wall and terminating at its free opposite projecting end into an end plate extending in substantially parallel relation to said initial wall and serving as a side stop or abutment means for the exposed longitudinal front edge face of one beam end and preferably of the adjacent ends of two adjacent beams carried by a same support. In such a case and according to a further characterizing feature of the invention the method consists in laying said beams on their respective supports by positioning same so as to adjust their longitudinal visible front edge faces to said theoretical local reference distance values so that said front edge faces of said beams be contained in said reference surface; filling up all the free spaces or voids left between at least the end portions of each beam on the one hand and said initial wall as well as in particular said stop or abutment means for the beam edge face onto said supports on the other hand by injecting therein said filling product with a view to thereby seal and fill up at least locally all the joints, gaps and interstices for instance at least partially about or on either side at least of the end portions of said beam; and allowing said filling product to set or harden for thereby rigidly holding definetely each beam against motion through adhesive bonding or like connection in its nominal prescribed position.

According to still a further characterizing feature of the invention, the method consists in fitting the bottoms, backs or rear sides of said boxes before mounting thereof with said filling product or with a like, similar or equivalent bonding substance and then immediately afterwards mounting said boxes individually or collectively for instance in groups in sidewise juxtaposed and overlying relationship between the rows of said aligned or registering beams against the latter and against said initial wall; perfectly alining the exposed front or inner face of each box in registering relationship with respect to said ideal reference surface defined by said rows of beams by exerting a force with a relatively moderate pressure onto said face in particular for pressing said boxes against said initial wall through the medium of said filling product thereby causing said filling product to undergo some crushing, squeezing or collapsing through creeping effect in the plastic condition between the boxes and the initial wall to thus enable the individual adaptation of each box to the local surface shape or irregularities of said initial wall; and eventually allowing said filling product to set or harden thereby rigidly and definetely retaining and keeping said boxes in at least theoretically correct positions.

According to still another characterizing feature of the invention said filling product or sealing compound is coated or applied before mounting said boxes onto the bottom or back side of each box either in discontinuous patches or discrete threads or dashes or in continuous beads, this coating being limited to the bearing areas of the inner in particular longitudinal compartment partitions as well as at and along the outer longitudinal walls forming the supporting structure of said box, so that the latter bears or rests preferably only therethrough against said initial wall rather than through the whole bottom surface of said box.

In the case for instance of its applying to the integrated tanks of the type referred to hereinabove the invention thus offers the advantage of significantly improving the process for mounting said supporting secondary heat insulation by enabling an accurate positioning of the component elements of this insulation in their desired exact relative positions to achieve a good bearing engagement in particular of the boxes on or against the wall of the ship's hold or hull structure in spite of the existence of surface deficiencies exhibited by any metallic wall in particular made from sheet metal and which consist for instance of permanent sets or strains of general or local character, of welding allowances or extra thicknesses, of variations or differences in thicknesses between metal sheets or of other like manufacturing, building, assembling or mounting defects due to faulty worksmanship. The invention also offers the attendant additional advantage of achieving a full effectiveness and operating reliability of the structure obtained.

The invention will be better understood and further objects, goals or aims, characterizing features, details and advantages thereof will appear more clearly as the following explanatory description proceeds with reference to the accompanying diagrammatic drawings given by way of non limitative examples only illustrating various specific presently preferred forms of embodiment of the invention such as applied for instance to the construction of an integrated tank of the aforesaid type and wherein:

FIG. 1 is a fragmentary perspective view with partial sections and parts broken away, showing a portion of a vertical wall of a ship's hold and in particular of the inside wall sheet metal of that portion of its double-walled hull forming for instance the side of the ship and fitted in part with its supporting secondary heat insulation;

FIG. 2 is a fragmentary perspective view of a portion of vertical wall of the hold with two sections of vertically spaced rows or lines of aligned planks or like wood beams showing each one free adjacent planks laid respectively on two successive end supports common to two adjacent planks and defining contiguous spans while bounding a cell for housing or accommodating the boxes; the view of the upper row illustrating the step of adjusting the relative horizontal positions of the planks in a direction normal to the wall by causing same to conform to the prescribed nominal distance value from the wall whereas the view of the lower row illustrates the step of injecting the filling product or sealing compound between the exposed vertical edge face of the end of a plank and the adjacent vertical front stop or abutment plate of the adjacent plank support as well as between the vertical rear edge face of one plank end and the vertical wall of the hold, respectively;

FIG. 3 is a perspective view of a box the outside upward facing bottom or back surface of which is fitted with resilient pads or shims and with parallel beadings or strings of filling product;

FIG. 4 is a fragmentary view partially in vertical section taken at right angles to said vertical wall of the hold, illustrating the step of mounting a group of like overlying boxes superposed in close order in engaging relationship to form a pile filling in a vertical span of the cell defined between two vertically spaced horizontal rows of aligned planks and two pairs of plank supports;

FIG. 5 is a view similar to the preceding one and showing the step of mounting a clamping tool or like implement adapted for alining the superposed boxes of said group of boxes in registering relationship;

FIG. 6 is a view similar to the preceding one showing the step of aligning boxes by means of said tooling;

FIG. 8 is a perspective view of an auxiliary frame for mounting boxes (against a horizontal or slanting flat wall of a ceiling) provided with its removable pads or blocks for bearing engagement with the planks;

FIG. 9 is a partial view in vertical section taken at right angles to a horizontal flat wall of the ceiling of the hold, showing the step of positioning a group of like horizontally juxtaposed boxes inserted between two horizontal rows of aligned planks by means of the auxiliary mounting frame fitted with removable pads or blocks for bearing engagement with the planks;

Figure 11:
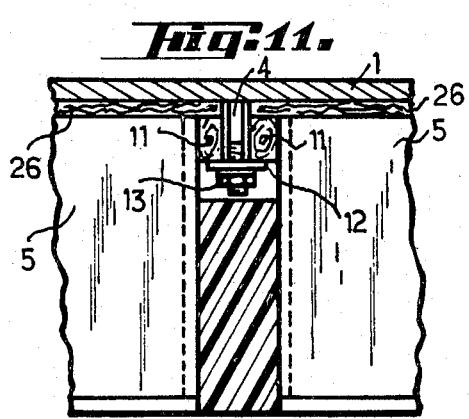

FIG. 10 is a cross section taken upon the line X—X in FIG. 9 and showing two parallel adjacent groups of juxtaposed boxes retained by their aforesaid auxiliary mounting frames after removal of the removable pads or blocks and full insertion of the groups of boxes between the two rows of planks, this view illustrating the step of aligning the two groups of boxes in registering relationship by means of a pair of clamping tools mounted in temporary operative working positions; and FIG. 11 is a fragmentary view on a larger scale in horizontal section taken at right angles to said vertical hold wall and showing the joint or combined anchoring of two adjacent boxes of a same horizontal row of aligned boxes at their adjacent ends by means of said stud-bolts as well as the filling up or sealing of the gap between two adjacent vertical groups of piled-up boxes between two successive superposed horizontal rows of aligned planks by means of a strip of heat insulating material.

Figure 1:
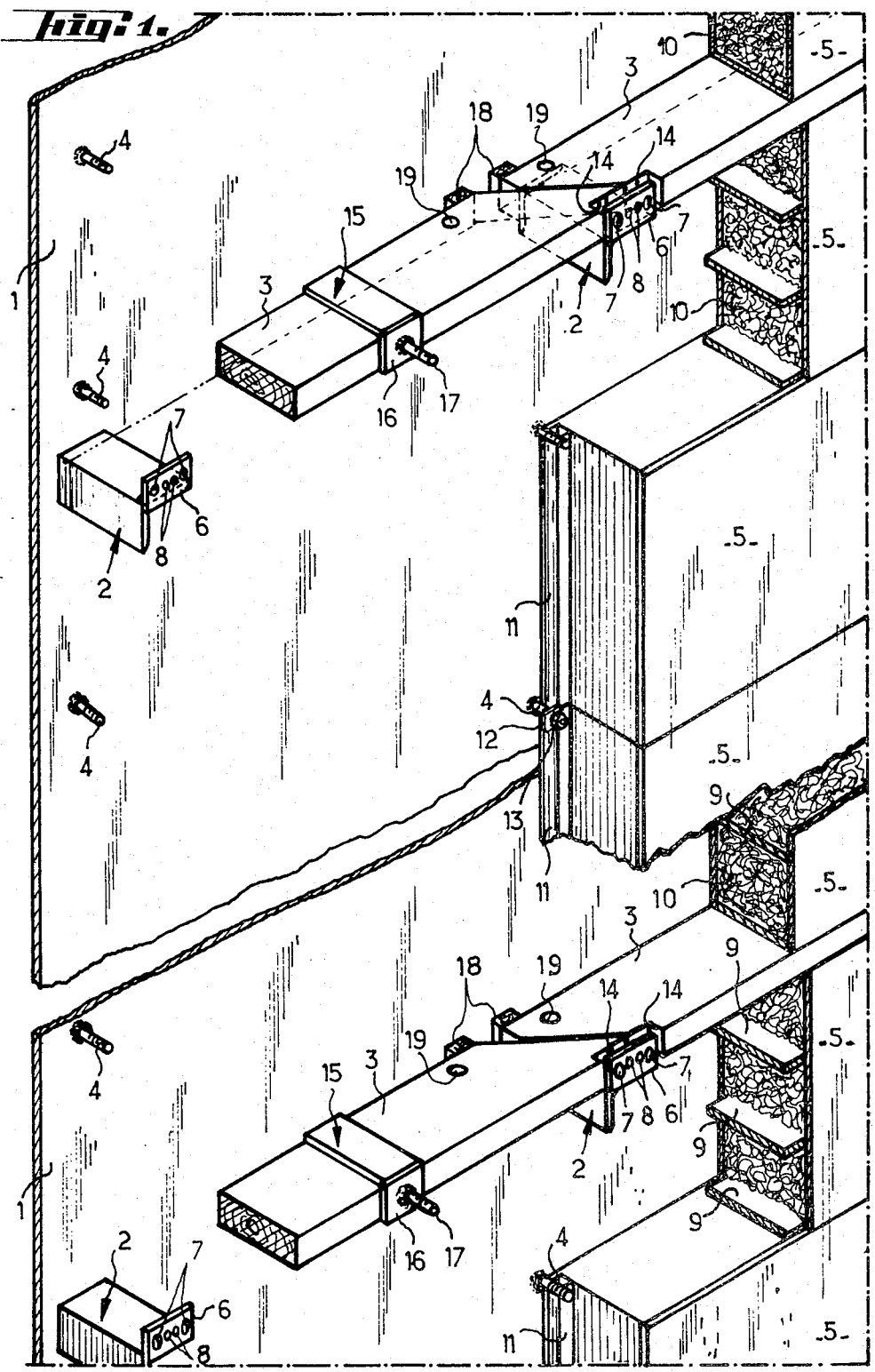

According to the examplary form of embodiment shown in FIG. 1 the secondary heat insulation is mounted on a substantially vertical sheet metal wall bounding the inner hold of a ship and consisting either of the inside wall of the double-walled hull forming a ship's side or of a transverse partition or bulkhead forming a cofferdam or the like for instance. The secondary heat insulation of the integrated tank is of course also mounted onto walls other than the side walls, such as horizontal surfaces of the flooring or bottom plating and top ceiling surfaces forming for instance the underside of a deck as well as sloping walls forming top and bottom cant-wall sections. The metallic wall 1 directly carrying the secondary heat insulation accordingly comprises on the one hand spaced plank supports 2 aligned in registering relationship along two orthogonal vertical and horizontal directions, respectively, while being preferably uniformly distributed in either direction for supporting planks 3 aligned in vertically spaced parallel horizontal rows, respectively, and on the other hand spaced stud-bolts 4 aligned in registering relationship in vertical and horizontal rows, respectively, corresponding to the rows of plank supports 2 and adapted to secure the heat insulating boxes 5 piled up and juxtaposed against the sheet metal wall 1 within each intermediate space between any two successive rows of planks 3. Each plank support 2 is a metallic bracket with a substantially angle-shaped cross sectional contour so that one horizontal top flange of the support may serve as a common bearing rest for the adjacent ends of any two successive planks 3 of a same horizontal row which are laid onto this flange of the support the lengthwise direction of which is extending at right angles to the wall 1. Each support 2 is provided at its free projecting tip or end with a vertical stop or abutment plate 6 formed with two pairs of horizontally aligned through-holes, these four holes comprising two smooth or plain injection end holes 7 and two intermediate tapped or screw-threaded holes 8. The horizontal top flange of each support may also be formed with at least one smooth through-hole possibly for securing a plank by means of woodscrews for instance.

The process for mounting the secondary heat insulation therefore consists at first in defining on the wall 1 shown in FIG. 1 the respective positions or locations of the plank supports 2 and stud-bolts 4 according to a substantially regular network forming a pattern of cross-rulings or squaring of checker-board or grid-shaped layout with rectangular geometrical mesh-like areas or divisions bounded by the respective vertical and horizontal alignments.

The heat insulating boxes 5 of parallelepipedic shapes are identical with each other and of such sizes that each aforesaid rectangular mesh-like area forming a cell bounded at the four corners by four plank supports 2, respectively, between any two horizontal successive rows of planks 3 may be completely filled by a group for instance of five boxes 5 superposed or piled up in closely engaging order. Each box 5 is hollow and its inner cavity is divided into compartments on the one hand by a series of longitudinal spaced partitions 9 extending in parallel relation to the horizontal rows of planks 3 when the box is mounted onto the wall 1 while extending at right angles to the wall 1 and on the other hand by transverse partitions, the compartments of each box being filled with a heat insulating powdery material called Perlite 10. Each box comprises on each side, i.e. on each transverse end wall a flange or ledge consisting of a sidewise projecting cleat 11 directed vertically when the box is positioned and extending along the adjacent edge in flush relation to the bottom or back side of the box to be used for affixing the box against the wall 1 by means of the stud-bolts 4 with a washer or like bearing plate 12 slipped over each stud-bolt and tightly pressed against the corresponding cleat 11 of the box by means of a nut 13 screw-threaded onto the free end of the stud-bolt involved. Each box 5 is thus advantageously secured by means of four stud-bolts 4 arranged at the four box corners, respectively, and each stud-bolt is used for the joint or combined anchoring of two horizontally juxtaposed boxes 5 and possibly also of two adjacent vertically superposed boxes 5, so that each vertical row of stud-bolts 4 is located between two vertical rows of stacked boxes whereas each horizontal intermediate row of stud-bolts 4 is located substantially on a level with the plane of the horizontal common joint between two horizontal superposed rows of juxtaposed and stacked boxes.

After said positioning the local topographical plots on the wall 1 are effected at the various locations of the plank supports 2, respectively, with respect to a luminous vertical reference plane provided by a rotary coherent light source forming a laser beam generator (based on light amplification through stimulated emission of radiation) as initially mentioned and these measurement data or information are conveyed to a computer or like data-processing machine which would process them for defining a reference surface complying locally to the prescribed tolerance requirements (defining maximum deviation or deviation slope limits at each plank support location in two orthogonal main vertical and horizontal directions, respectively, in the case of the vertical wall 1).

Then the stud-bolts 4 are affixed to the metallic wall 1.

The following step consists in mounting and welding the plank supports 2 to the wall 1, every support 2 being previously formed with the various aforesaid holes, respectively, in its flange if need be and in its terminal end plate 6 extending transversely of and at right angles to the flanges of the sectional bar member forming the support so as to be substantially parallel with the wall 1 in the mounted condition of the support 2. The step for laying each plank support 2 consists in presenting, positioning and holding said plank support by making use of two stud-bolts 4 already affixed and located near the plank support to be secured.

After the step of mounting the stud-bolts 4 and plank supports 2 onto the wall 1 is carried out the mounting of the planks 3 prefabricated in the workshop or factory and which have previously undergone a preparatery operation before being mounted.

This preparation consists in particular in notching, nicking, grooving, slotting or cutting out the plank at each end thereof on its longitudinal vertical front edge face into a cut-out having the shape of a right-angle dihedron forming a kind of groove, rebate or like rabbet or recess 14 adapted to serve as a housing for accommodating the vertical end plate 6 located at the projecting tip of the corresponding plank support 2 and co-extensive with the wall 1 and with said front edge face so as to embed or sink this end plate 6 in order that it be recessed from said edge face so as to not project therefrom. Then on each plank 3 is slipped a rectangular central metallic strap, brace or like clip 15 surrounding the plank while conforming to its cross sectional contour and provided on its front face with a small vertical plate 16 applied against the vertical front edge face of the plank 3 and provided with a screw-threaded stud-bolt or the like 17 serving for supporting the primary heat insulating framework. This strap 15 is mounted substantially in the middle of the length of the plank. The vertical rear or back edge face of each plank 3, i.e. the longitudinal face adapted to face the wall 1 receives two resiliently deformable or compressible pads 18 made from for instance synthetic heat insulating material such as polyvinyle chloride foam or possibly expanded polyurethane arranged at both opposite ends, respectively, of the plank 3 so that these resilient pads be in close vicinity of the respective corresponding plank supports 2. Each plank 3 has two inclined injection holes 19 drilled therethrough in the horizontal longitudinal side face of the plank between the resilient pads 18, respectively, so that each injection hole 19 opens through the vertical back edge face of the plank in front of the wall 1.

After these preparatory works each plank 3 is positioned on its two successive metallic supports 2 of a same horizontal row of supports so as to rest with its opposite ends onto the horizontal flanges, respectively, of both supports, each support 2 being common to both respective adjacent ends of two adjacent planks.

Then two set screws 20 are mounted into both central tapped holes 8, respectively, of the end plate 6 of each plank support 2 so that each screw be horizontally in abutment against the innermost vertical end face of the corresponding notch 14 at the end of a corresponding plank.

Figure 2:
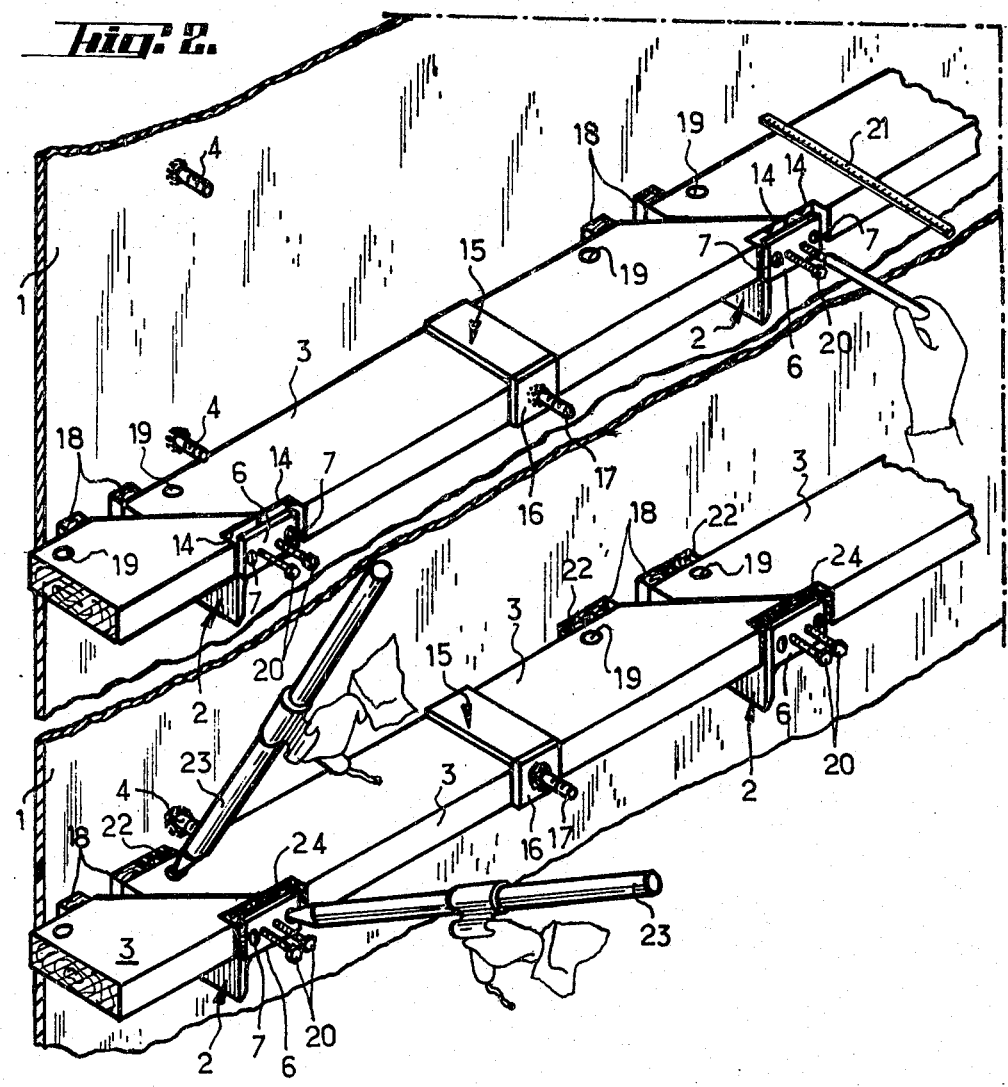

The relative position of each plank 3 is then adjusted in the horizontal direction at right angles to the wall 1 by acting as shown at the top of FIG. 2 upon the set screws 20 to shift the vertical front edge face of each plank 3 to the prescribed nominal distance value (relative to the wall 1) as determined by data processing through the computer. The method for adjusting to the nominal distance value by means of the set screws 20 enables an accurate approach to the desired exact relative position owing to the co-operation of the resilient pads 18 likely to undergo a reversible deformation through compression and performing the functions of attendant biassing springs so that it is possible by screwing the screws 20 to push the plank 3 by driving it backwards against the wall 1 or reversely by unscrewing or loosening the screws 20 to cause the plank to move forwards, i.e. further away from the wall 1 due to the resilient release action of the pads 18. The control for checking the adjustment to the desired distance value is advantageously carried out by means of a graduated rule 21 (see FIG. 2) held to extend at right angles to the sheet metal wall 1.

The set screws 20 being still in position, the void space left between the wall 1 and each portion of front edge face of every plank is filled up with an adhesive or bonding and settable or hardenable sealing compound or like stuffing product 22 which is in the plastic condition initially, i.e. temporarily in a soft or pasty state; such a product or compound is for instance based upon a polymerizable epoxy resin. This product is injected under pressure by means of a suitable nozzle or squirt 23 (see bottom of FIG. 2) through the slanting injection holes 19 provided in each plank so that the stuffing product 22 come out or be expelled between the wall 1 and the plank 3 for stopping any clearance left between the wall and the plank. Then the free space left between the front end plate 6 of each plank support 2 and each adjacent plank 3 is stopped out through injection of said stuffing product or sealing compound 24 by means of the squirt nozzle 23 through the smooth holes 7 extending through the end plate 6.

After setting or hardening in particular through polymerization of said filling product each plank is locked or held against motion in the proper position by means of this filling product which forms an adhesive bonding connection between every plank 3 on the one hand and the metallic wall 1 as well as the metallic supports 2 on the other hand thereby fixing each plank in the desired exact relative position. The fastening of each plank on its two adjacent supports may possibly be completed by means of wood screws screwed into the plank through the metallic supports 2. In the case where the metallic wall 1 is horizontal or sloping by forming a flooring or sloping wall of the hold it is advantageous to arrange wedges near the locations reserved for filling up behind each plank so as to prevent any undue crushing or squeezing of the resilient pads 18 by the own weights of the planks.

Then there is carried out a cleaning and possibly a pumicing or sandpapering of each plank and afterwards the set screws 20 are removed after suitable setting of the filling product 23–24 and eventually the correct relative position of the front edge faces of the planks in each horizontal row of aligned planks is possibly checked.

The secondary framework is then ready to receive the boxes 5.

Before their being mounted the prefabricated boxes 5 undergo a preparation consisting in possibly affixing (except for the ceiling boxes) in particular through gluing or adhesive bonding, four resilient guard pads or shims 25 (see FIG. 3) made from heat insulating material such as polyvinyle chloride onto the outer bottom or back side surface of each box towards the four corners, respectively, thereof and coating for instance simultaneously by means of a bank of multiple applicator nozzles onto said bottom straight continuous parallel spaced longitudinal strings 26 or discrete patches of a settable sealing compound or filling product temporarily retaining its plastic condition such as a polymerizable epoxy resin or polyurethane at and along the outer side walls and the inner longitudinal dividing partitions of said box. The application of this filling product may advantageously be carried out through a continuous or intermittent operating step by means of an automatic machine for injecting and applying the filling product onto the bottoms of the boxes, this machine exhibiting a tunnel through which a series of successive boxes is caused to move. The resilient pads 25 have the purpose of possibly preventing any untimely crushing or collapse of the strings 26 of filling product under the own weights of the boxes.

Figure 7:
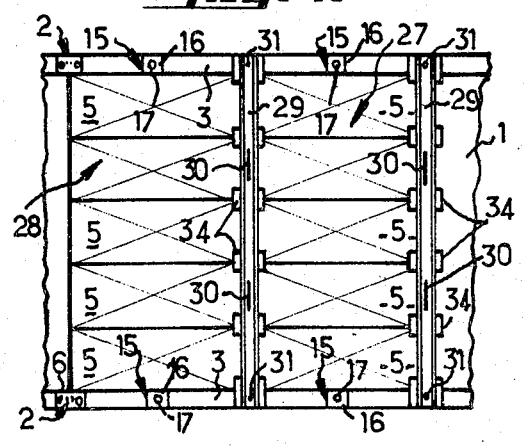
FIG. 7 is an elevational front view drawn on a smaller scale and seen in the direction of the arrow VII in FIG. 6, showing a wall portion of the hold provided with two adjacent vertical groups of boxes piled up between the two aforesaid horizontal rows of planks together with two alignment adjusting toolings in operative working positions.

Then is carried out the dressing of a cell of said crisscross pattern bounded by two corresponding superposed planks of a pair of horizontal successive rows of aligned planks. Such a dressing consists in mounting against the wall 1 and onto two successive planks 3 of the lower row of planks, respectively and successively, two contiguous groups side by side of several (for instance five in the present case) prepared boxes 5 superposed successively in closely engaging order in each group from bottom to top according to a substantially aligned stacking filling up the space left between both parallel lower and upper rows, respectively, of planks (see FIGS. 4 and 7). In FIG. 7 the first group of boxes to be mounted is the group 27 and then comes the group of boxes 28 both of these groups being arranged on either side, respectively, of a vertical intermediate row of stud-bolts 4 while distributing the spaces between stud-bolts and boxes on either side of each group. The laying of five stacked boxes of each group is carried out by hand without any adjustment the operator successively positioning each box while only causing the filling product present on the bottoms of the boxes to engage or contact the wall 1 while avoiding as much as possible a successive staircase-like or stepped stacking.

The alignment of the front faces of the boxes with respect to said reference lines of the planks of both superposed rows is achieved by means of a small handoperated clamping implement. Each clamping tool for adjusting the alignments of the boxes comprises a straight relatively stiff pressure bar 29 provided outside with handling grips 30 and anchored at both of its opposite ends, respectively, onto the corresponding end plate 6 of the associated plank supports 2 by means of mechanical screw jacks or the like 31. As shown in FIG. 5 each clamping or pressure bar 29 is for instance slidably mounted with one hole at each end onto a threaded clamping rod 32 screwed into a tapped hole 8 of the corresponding end plate 6 of the associated plank support 2 and the bar is then gradually pressed against the boxes until abutting against the lower and upper planks, respectively, by means of collar nuts 33 screwed onto said threaded rods (FIGS. 5 and 6). To prevent any possible bending of the bar 29 each bar may also be possibly engaged with box-fastening stud-bolts 4 usable as intermediate clamping points. The bearing or engaging face of each clamping bar 29 is provided with spaced bearing plates 34 through which each bar 29 is adapted to bear against the boxes in straddlewise relation to their successive horizontal joints, one of the two bars being placed along the free vertical right-hand edges of the first group of boxes 27 (in FIG. 7) whereas the other bar is arranged to straddle the intermediate gap left between both groups of boxes 27, 28. Each bar 29 advantageously exhibits a U-shaped cross sectional contour and is provided with handling grips 30 located on the outside between both flanges of the sectional bar the small plates 34 provided on the inside thereof possibly consisting of plywood bearing plates. Each bar is formed with at least one elongated through-hole at each end for convenient anchoring onto an end plate 6 and possibly with intermediate through-holes in the center of each bearing plate, respectively, to correspond to said stud-bolts 4.

When both pressure bars 29 are caused to engage the planks 3 the mounted boxes are adjusted to their proper positions. This approaching engagement under pressure of the five boxes of each group with the wall 1 is obtained by crushing or squeezing the filling product 26 located between the bottoms of the boxes and the wall 1. During this approaching engagement the shims 25 secured to the bottom of each box form resilient pads inserted between the boxes 5 and the wall 1, which resilient pads will promote the adjustment of the boxes to achieve a good alignment of the front faces thereof. All the irregularities of the metallic wall surface 1 are thus automatically compensated for owing to the filling product which at the same time achieves an outstanding bearing engagement of the boxes (see FIG. 6). The filling product is then allowed to set or harden in particular through polymerization thereof and it then provides an immovable adhesive bonding connection locking or holding the boxes against motion in their proper positions. The boxes are then additionally secured to the wall 1 by means of the fastening stud-bolts 4 through the medium of bearing washers 12 clamped by corresponding nuts 13 against the cleats 11 forming the ledges or flanges of the boxes.

This symplified process for mounting the boxes 5 is moreover advantageous by the fact that it enables on the one hand to easily control or check before the mounting the coating of the bottoms of the boxes with the filling product; on the other hand to achieve a continuous bearing engagement of the supporting heat insulation at all the longitudinal partitions of the boxes and finally to obtain without any special correction and in compliance with the required tolerances a proper bearing surface for applying the secondary barrier thereto and then a satisfactory bearing engagement of the boxes forming the primary heat insulation.

The clamping bars 29 are removed after setting of the filling product 26.

For mounting the boxes 5 onto the horizontal ceiling 35 between two successive parallel rows of aligned planks each box is prepared in the aforesaid fashion but without comprising any pads 25 on its bottom and for laying the boxes there is used a narrow auxiliary box-carrying frame 36 shown in FIG. 8. Each frame 36 consists of a narrow rectangular metallic stretcher (of a width smaller than the lengths of the boxes 5) adapted to receive four removable wood bearing pads 37 located at the four corners or apices, respectively, of the frame 36 on the inside face thereof. Each end cross member bracing the two parallel opposite longitudinal side members of the frame is formed with a smooth or plain through-hole 38 enabling to secure the frame transversely onto two successive parallel rows of planks. As previously any two successive cells of the wall will be dressed by positioning two adjacent groups of juxtaposed boxes. This mounting step consists in making use of the threaded stud-bolts 17 affixed to the small plates 16 of the straps, respectively, of two confronting or corresponding planks of both successive rows of planks; presenting an auxiliary box-carrying frame 36 on both respective threaded stud-bolts 17 of both transversely confronting planks by slipping the frame 36 over the threaded stud-bolts 17 through its holes 38, each frame 36 being long enough for engaging both successive rows of planks; positioning the removable shims or pads 37 between the frame 36 and both planks of the two rows it will bear against; screwing the collar nuts 39 onto said threaded stud-bolts for causing the frame 36 to abut the removable pads 37 hence the planks 3; positioning a group of a plurality of (for instance five) boxes 5 transversely juxtaposed successively on the frame 36 between both planks 3 (see FIG. 9); loosening or unscrewing the collar nuts 39 so as to be able to remove the detachable pads 37 and screwing these nuts again for raising the frame 36 together with the boxes carried thereby until it engages in directly abutting relationship the planks 3 while inserting the group of boxes properly between two successive parallel rows of aligned stud-bolts 4; possibly screwing threaded extension rods 40 provided with threaded sockets or bushings onto said stud-bolts 4, respectively, positioning in the same manner by means of a second auxiliary box-carrying frame a second group of several (for instance five) boxes beside the first group; and screwing locking stud-bolts into the end plates 6 of the plank supports 2 adjacent to both groups of boxes 41, 42 (see FIG. 10).

Then two clamping bars 29 similar to the bars used for the operating steps illustrated in particular in FIGS. 5 to 7 are positioned for aligning adjustment of the boxes of each group these bars bearing each one against the boxes in straddling relation to their successive horizontal joints while being respectively located along the free edge of the first group of boxes 41 in straddling relation to the intermediate gap between both group of boxes 41, 42. Each bar 29 is thus slidably mounted at each end onto a locking stud-both and possibly onto the threaded extension rods 40 screwed by means of their threaded sockets or sleeves onto the stud-bolts 4 and afterwards the collar nuts 33 are screwed onto said locking stud-bolts, respectively, and possibly also onto said extension rods 40 for causing each clamping bar to abut against both corresponding planks by gradually pushing the boxes against the ceiling 35. After setting of the filling product between the ceiling 35 and the bottoms of the boxes 5 and adjusting bars 29 are removed as well as the extension rods 40 together with the metallic frames 36 and the boxes 5 are secured as already stated by means of bearing washers and clamping nuts mounted onto the fastening stud-bolts for the boxes 4. A sheet of heat insulating material such as expanded polyurethane may eventually be inserted by means of a sheet metal pushing tool between the laid last box of each group and the adjacent plank.

The free space between two adjacent groups of boxes (laid against a vertical, horizontal or sloping wall) is eventually filled up with a continuous sealing strip of heat insulating material such as polyvinyle chloride foam 43 (see FIG. 11) concealing the fastening stud-bolts 4 and the visible or exposed inner face of which is substantially aligned in flush relationship with the front faces of the boxes 5.

The method according to the invention is of course applicable also for mounting the secondary in other parts of the integrated tank than the solid wall and in particular at the dihedral corners and rings. This method is also applicable to the building of tanks and other closed spaces or rooms in buildings and stationary plants such as land storage tanks.

It should be understood that the invention is not at all limited to the form of embodiment described and shown which has been given by way of example only. In particular it comprises all the means constituting technical equivalents of the means described as well as their combinations if same are carried out according to the gist of the invention and used within the scope of the appended claims.

What is claimed is:

1. A method of building in particular by means with juxtaposed modular units a real reference wall surface which, with respect to an initial wall surface, has an accurate geometrical definition and a prescribed relative nominal position which is predetermined at least locally with respect to said initial wall surface and is at least approximately flat, said reference wall surface forming at least a portion of a liquefied-gas storage tank, wherein the improvement comprises the steps of:
    previously determining a prescribed nominal distance value from the initial wall surface for positioning a framework adapted to support the modular units, positioning and affixing said framework to said initial wall surface, injecting a sealing compound into all the void spaces left between said framework and said initial wall surface, applying a suitable temporarily sealing compound to at least a predetermined portion of bearing faces of at least some of said modular units facing said initial wall and positioning said modular units on said framework against said initial wall in their respective corresponding relative exact positions, said suitable sealing compound being applied as coating and coated with a thickness and amount large enough to fill up any free spaces left between said initial wall surface and said portions of the bearing faces of said modular units, thereby serving as an intermediate steadying layer for retaining said modular units against motion.

2. A method according to claim 1, wherein each modular unit is a substantially parallelepipedic box comprising the further steps of affixing four guard pads of resilient materials respectively onto the four corners of said box on the bottom face of said units facing said initial wall, and thereafter applying suitable sealing compound coating onto said face.

3. A method according to claim 1, comprising providing each modular unit in the form of a substantially parallelipipedic hollow box whose inner cavity is divided into compartments by a series of longitudinal spaced partitions and transverse partitions, applying said settable sealing compound as a coating onto the face of each modular unit that is to face said initial wall in limited locations, said limited coating locations being in alignment with the location of internal bearing areas of said inner partitions and longitudinal supporting walls against said last-named face of said modular unit so that said unit will only be in bearing engagement through said coating against said initial wall rather than through the whole of said last-named face of said modular unit.

4. A method according to claim 1 comprising providing supports each in the form of a bracket having a flat upper flange, securing each bracket to said initial wall at a predetermined position so that its flange surface lies uppermost and extends at right angles to said initial surface, securing an end plate to each bracket at its free end in substantially parallel disposition relative to said initial wall, each of said end plates having a pair of tapped holes and a pair of smooth holes, affixing said framework by applying substantially aligned flat beams on adjacent pairs of flanges to form spaced rows of beams supported by the flanges of said brackets and lying between said initial wall and said end plates, said end plates serving as lateral stops for exposed longitudinal edge faces of beams borne on said flanges, positioning said beams applied to said flanges so that their front edge faces are in aligned positions at said prescribed nominal position, injecting said settable sealing compound to fill all voids, gaps and interstices between said initial wall surface and facing edge faces of said beams as well as between said end plates and said front edge faces of said beams, and permitting said settable compound to set and rigidly bond and permanently maintain said beams in said prescribed nominal positions of their front edge faces.

5. A method according to claim 4 comprising prefabricating each beam before mounting the same on said supports secured to said initial wall, said prefabrication comprising the steps of cutting out a notch at each end of said beam on its longitudinal front edge face, said notch having the shape of a right-angle dihedron for accommodating a said end plate of the corresponding bracket; fastening two resilient pads respectively to the rear longitudinal edge face of each beam at its ends, and drilling two inclined injection holes in each beam from a longitudinal major side face of said beam so that said holes open through said rear edge face of said beam between said resilient pads.

6. A method according to claim 4, further comprising the steps of positioning each aforesaid beam in bearing engagement against two of said flanges of two successive brackets, inserting two set screws into respective of said pair of tapped holes of the end plate of each bracket and tightening said screws to cause their inner ends to abut against said front edge face of said beam in the corresponding notch; adjusting the front edge face of each beam to said prescribed nominal position by manipulation of said set screws and available because of the reversible compressive deformations of said resilient pads; injecting suitable sealing compound under pressure through said inclined holes in each beam to fill up any void space existing between said initial wall and each beam existing between said resilient pads; filling out the free space left between the end plate of each beam support and each adjacent beam by injecting said same sealing compound under pressure through said smooth holes provided in each said end plate; allowing said sealing compound to set and removing said set screws after setting of said sealing compound has occurred; and checking the positions of the front edge faces of said beams.

7. A method according to claim 4, further comprising the steps of providing and securing spaced and aligned vertical rows of stud-bolts to said initial wall, successively mounting against said vertical initial wall and on two of said successive beams of a lower row of beams two sidewise justaposed contiguous groups of several modular units successively stacked in closely overlying engaging relationship from bottom to top in a substantially aligned pile filling out the space respectively left between two lower and upper parallel rows of beams on either side of a vertical row of said aligned stud-bolts for retaining and securing said units to said initial wall; positioning two clamping tools each one including each a pressure bar for adjusting the alignments of the units of each group, said pressure bars each being applied against said units in straddlewise relation to successive horizontal joints therebetween by being respectively arranged along a free edge of the first group of units and straddling the intermediate gap left between both groups of units, each tool being anchored at each end to a said end plate of a corresponding beam support by a threaded rod, and gradually pressing said tools against said units by screwing of nuts onto said threaded rods with some stud-bolts serving as intermediate clamping points until said pressure bars respectively engage in abutting relationship the lower and upper confronting edge faces of said beams, allowing said settable sealing compound to set and thereafter remove said tools and then mounting bearing washers and unit-clamping nuts onto said stud-bolts.

8. A method according to claim 7, further comprising the step of mounting said modular units against a said initial wall serving as a ceiling between two successive parallel rows of aligned beams, surrounding the middle of said two rows of beams by a collar-like strap provided with a front edge plate carrying a threaded stud-bolt, attaching an auxiliary unit-carrying narrow frame onto both respective threaded stud-bolts of two transversely confronting beams of said two rows of beams; positioning removable shim means respectively at the four corners of said frame between the latter and said continuing beams; screwing nuts onto said threaded stud-bolts to cause said frame to engage in abutting relationship said confronting beams through the medium of said removable shim means; positioning a group of several successively transversely juxtaposed modular units into said frame between said confronting beams; loosening said nuts and removing said removable shims and then re-tightening said nuts to raise said frame unit into direct abutting engagement with said confronting beams while inserting said group of units properly between two parallel rows of aforesaid aligned fastening stud-bolts; screwing threaded extension rod members each respectively formed with a threaded sleeve-like socket onto said fastening stlud-bolts; likewise positioning on a second auxiliary box-carrying narrow frame a second group of several modular units beside the first-named group of units; screwing locking stud-bolts into the end plates of said brackets; mounting a pair of clamping tools each including a pressure bar for adjusting the alignments of the units of each group, so that each pressure bar bears against said units in straddling relation to the horizontal successive joints therebetween so as to be respectively arranged along the free edge of the first group of units in straddling relation to the intermediate gap left between two adjacent groups of units; each tool being slidably mounted at each end onto a locking stud-bolt and onto threaded extension rod members; screwing and tightening nuts respectively onto said locking stud-bolts and said threaded extension rod members to cause such tool to engage in abutting relationship, both said rows of beams by gradually pushing said units against said initial wall; thereafter allowing said settable sealing compound to set, then removing said tools and securing said units by said initial washers and clamping nuts mounted onto said fastening stud-bolts.

9. A method according to claim 7, further comprising the step of filling up any void space between two adjacent groups of the units with an intermediate strip of filling material.

* * * * *

UNITED STATES PATENT AND TRADEMARK OFFICE
CERTIFICATE OF CORRECTION

PATENT NO. : 3,996,717
DATED : December 14, 1976
INVENTOR(S) : Sallenave et al.

It is certified that error appears in the above-identified patent and that said Letters Patent are hereby corrected as shown below:

Column 2, line 66, before "wall" insert --initial--;

Column 13, line 48, delete "and" (second occurrence) and substitute --the--;

line 65, insert --heat insulation-- after "secondary"; and

Signed and Sealed this

Fifth Day of April 1977

[SEAL]

*Attest:*

RUTH C. MASON
*Attesting Officer*

C. MARSHALL DANN
*Commissioner of Patents and Trademarks*